United States Patent [19] [11] 4,036,059
Cliff [45] July 19, 1977

[54] THERMAL SYSTEM
[75] Inventor: Thomas Charles Cliff, St. Austell, England
[73] Assignee: United Gas Industries Limited, London, England
[21] Appl. No.: 650,615
[22] Filed: Jan. 20, 1976
[30] Foreign Application Priority Data
Feb. 14, 1975  United Kingdom ............... 6309/75
[51] Int. Cl.² .............................................. G01K 5/10
[52] U.S. Cl. .................................................... 73/368
[58] Field of Search .................. 73/368, 371; 228/154
[56] References Cited
U.S. PATENT DOCUMENTS
2,037,949   4/1936   Tate ................................... 73/368 X
2,415,309   2/1974   Stone ................................. 73/371 X
3,100,330   8/1963   Rice etal. ............................. 228/254
3,100,398   8/1963   Munk ................................ 73/368 X
3,812,719   5/1974   Shopsky ................................. 73/368

Primary Examiner—Richard C. Queisser
Assistant Examiner—John S. Appleman
Attorney, Agent, or Firm—Larson, Taylor and Hinds

[57] ABSTRACT

This invention relates to thermal system comprising a phial of liquid and a capillary tube leading therefrom, the phial experiencing a high temperature which progressively drops along the length of the capillary. To avoid unnecessary expense, the phial and an appropriate length of capillary tube are formed of highly corrosion-resistant metal while the rest of the capillary is formed of cheaper metal.

5 Claims, 4 Drawing Figures

THERMAL SYSTEM

This invention relates to thermal systems of the kind where a phial of fluid is exposed to heat, the consequent expansion of the fluid or increase of vapour pressure being transmitted by a capillary tube leading from the phial. Such systems will be termed hereinafter "thermal system of the kind described".

The phial and the fluid therein are exposed to arduous temperature conditions in which corrosion or other attack on the material of the phial may occur. Materials resistant to such attack are known but are frequently expensive.

The invention comprises a thermal system of the kind described formed in two parts, one part including the phial being formed of a highly corrosion-resistant metal and the other part, including at least part of the capillary tube being formed of a less corrosion-resistant metal, the two parts being sealed to one another at a joint.

The joint may comprise a welded joint or alternatively a lapped joint which is brazed.

According to a preferred arrangement for use with mercury as the fluid, the highly resistant metal is substantially nickel-free steel or a metal of comparable corrosion-resistance and the less resistant metal is stainless steel. The joint may be brazed with a substantially mercury-resistant alloy.

The lapped joint may be made a closer fit by swaging or rolling the outer layer down onto the inner layer befoe brazing. The position of the joint is chosen to be far enough from the temperature source to which the phial is exposed to be itself at a temperature where the liability to attack is reduced to an acceptable level.

Specific examples of the invention are shown in the accompanying drawings in which.

Figure 1:
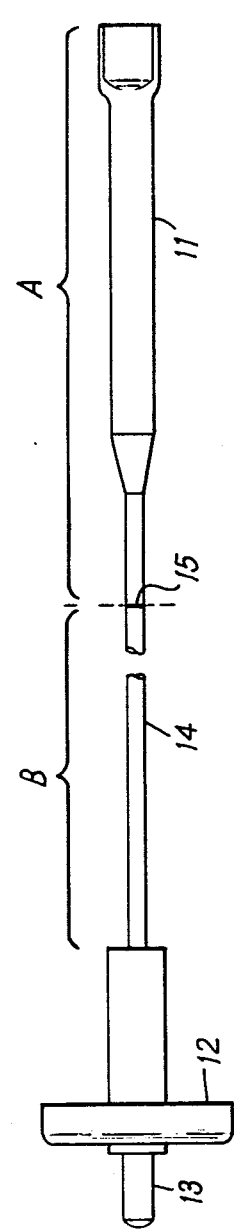
FIG. 1 is a side view of a first embodiment of a thermal system.

Referring first to FIG. 1, the thermal system comprises a phial 11 which contains mercury, a capillary tube 14 connected to the phial and a flexible container 12 having an operating button 13 and brazed to the capillary tube, the whole forming a sealed system. The phial is subject to the temperature, for instance, of a flame and the mercury therein expands, increasing the pressure in the capillary tube and flexible container. A flexible end of the container on which button 13 is mounted therefore moves as the container expands, so moving the button to operate further mechanism (not shown). The further mechanism may for instance be an electric switch or a gas valve.

Mercury or mercury vapour attacks many of the commonly-used materials, especially metals and particularly when operation at high temperature is involved, e.g. over 100° C. Suitable metals which are resistant to this attack are steels having negligible nickel content, for instance that specified as American Iron and Steel Institute Specification No. 446. This material is very expensive however.

With the phial 11 positioned in a flame, there is a temperature drop along the length of the capillary tube, so that the liability to attack by the mercury vapour decreases with distance away from the phial. Accordingly the phial and capillary are made in two parts, A and B. Part A which includes the phial 11 is made by drawing or swaging from the expensive AISI 446 substantially nickel-free steel. Part B is formed from stainless steel. The two parts are joined at 15 by welding. The position of the joint 15 is chosen with relation to the temperature drop along the capillary so that the part B is not subjected to unacceptable attack by the mercury vapour. For instance, joint 15 may be at that point where the temperature drops to 100° C, at which temperature the stainless steel may be expected to have a life of the order of 20 years, which is acceptable for most instruments.

Figure 2:
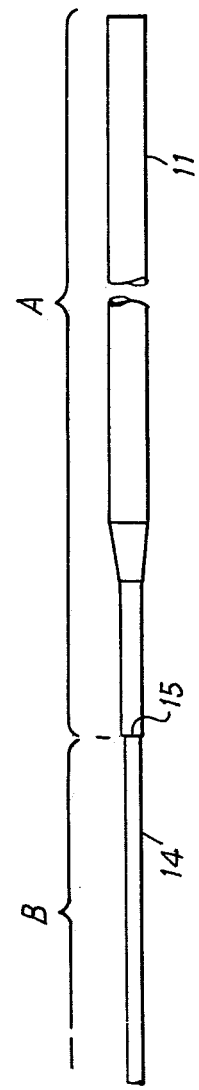
FIG. 2 is a side view of part of a second embodiment.
Figure 3:
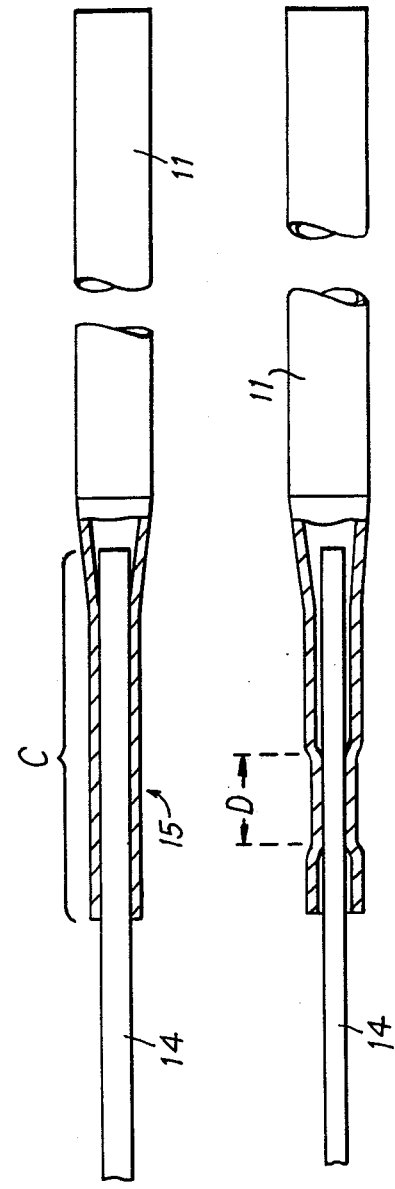
FIG. 3 is a detail, partly in section, of the embodiment of FIG. 2.

In the alternative embodiment of FIGS. 2 and 3, the same parts are shown indicated by the same reference numbers as in FIG. 1. In this case however the joint 15 is formed by welding or by brazing with a substantially mercury-resistant alloy, e.g., that known commercially is "NICROBRAZ". Although resistant this alloy is still liable to some attack, so to reduce the area exposed to the mercury to a minimum, the joint 15 is formed as seen best in FIG. 3, by making the end of the part A a close fit over a length C of the capillary 14. This length is then brazed.

Figure 4:
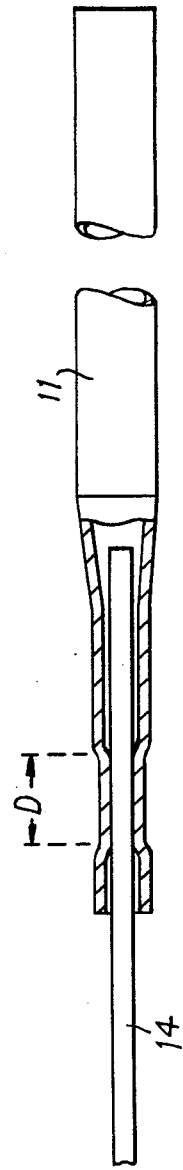
FIG. 4 is a detail, partly in section, of a further embodiment.

As shown in FIG. 4, the fit of the end of part A over the end of the capillary tube may be made closer by mechanically closing the end of part A onto the capillary over a short length D. This length may for instance be swaged or rolled. The joint is then made hermetic by brazing. In this case even less of the brazing alloy is exposed to the mercury.

I claim:

1. A thermal system of the kind comprising a phial for containing mercury and a capillary tube leading from the phial, said system being formed in two parts, one part including the phial and a length of the capillary tube being formed of substantially nickel-free steel and the other part comprising the rest of the capillary tube being formed of stainless steel, the two parts being sealed to one another at a joint made at a point along the length of the capillary tube where it is exposed to a temperature at which the liability to corrosive attack by the mercury is reduced to an acceptable level.

2. A thermal system as claimed in claim 1, wherein the joint is formed by lapping one part over the other and brazing them together.

3. A thermal system as claimed in claim 2, wherein the lapped parts are pressed together before brazing.

4. A thermal system of the kind comprising a phial of liquid and a capillary tube leading from the phial, which system is formed in two parts, one part including the phial and a short length of capillary tube, being formed of a highly corrosion-resistant metal, and the other part including the rest of the capillary tube being formed of a less corrosion resistant metal, the two lengths of capillary tube being jointed together and the said short length being chosen so that the joint is located at a point where it will experience a lower temperature than the phial at which temperature the liability to corrosive attack is reduced to an acceptable level.

5. A thermal system as claimed in claim 4, wherein the joint is a welded joint.

* * * * *